US012704638B2

(12) United States Patent
Li et al.

(10) Patent No.: US 12,704,638 B2
(45) Date of Patent: Aug. 11, 2026

(54) METHOD, APPARATUS, AND RELATED DEVICE FOR IDENTIFYING GNSS PSEUDOLITE DATA

(71) Applicant: HUAWEI TECHNOLOGIES CO., LTD., Shenzhen (CN)

(72) Inventors: Jihong Li, Shenzhen (CN); Le Ge, Shanghai (CN); Zhaogen Yin, Shanghai (CN); Yang Gu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 297 days.

(21) Appl. No.: 18/307,927

(22) Filed: Apr. 27, 2023

(65) Prior Publication Data

US 2024/0077621 A1 Mar. 7, 2024

Related U.S. Application Data

(63) Continuation of application No. PCT/CN2021/126328, filed on Oct. 26, 2021.

(30) Foreign Application Priority Data

Oct. 29, 2020 (CN) ......................... 202011180719.X

(51) Int. Cl.
*G01S 19/11* (2010.01)

(52) U.S. Cl.
CPC .................................. *G01S 19/115* (2019.08)

(58) Field of Classification Search
CPC .................................................... G01S 19/115

(Continued)

(56) References Cited

U.S. PATENT DOCUMENTS 6,336,076 B1 * 1/2002 Farley ..................... G01S 19/11 342/357.41
9,720,095 B2 * 8/2017 Rife ........................ G01S 19/08

(Continued)

FOREIGN PATENT DOCUMENTS

CN 101950025 A 1/2011
CN 106970399 A 7/2017

(Continued)

OTHER PUBLICATIONS

Van der Merwe et al. "Blind Spoofing GNSS Constellation Detection Using a Multi-Antenna Snapshot Receiver," Sensors 2019, 19, 5439; doi:10.3390/s19245439 (Year: 2019).*

(Continued)

*Primary Examiner* — Samarina Makhdoom
(74) *Attorney, Agent, or Firm* — Rimon PC

(57) ABSTRACT

A target device receives a plurality of pieces of first data, where each piece of the plurality of pieces of first data includes first ephemeris information and/or first almanac information. The target device identifies abnormal first data among the plurality of pieces of first data, where the plurality of pieces of first data include the abnormal first data, and the plurality of pieces of first data are obtained by the target device from a plurality of access network devices. A plurality of pieces of first ephemeris information and/or a plurality of pieces of first almanac information in the plurality of pieces of first data correspond to a first satellite. The target device may determine, by using the plurality of pieces of first ephemeris information and/or the plurality of pieces of first almanac information, that a piece of first ephemeris information and/or a piece of first almanac information is abnormal.

11 Claims, 5 Drawing Sheets

(58) Field of Classification Search
USPC .................................................... 342/357.66
See application file for complete search history.

(56) References Cited

U.S. PATENT DOCUMENTS

| | | | | |
|---|---|---|---|---|
| 2013/0328719 | A1 | 12/2013 | Gum et al. | |
| 2015/0168558 | A1* | 6/2015 | Grelier | G01S 19/13 342/357.51 |
| 2019/0020633 | A1* | 1/2019 | Leavy | H04L 9/14 |

FOREIGN PATENT DOCUMENTS

| | | | |
|---|---|---|---|
| CN | 107064963 | A | 8/2017 |
| EP | 2796895 | A1 | 10/2014 |
| JP | H08101265 | A | 4/1996 |
| JP | H10213643 | A | 8/1998 |
| JP | H11118900 | A | 4/1999 |

OTHER PUBLICATIONS

Heng et al. "GPS Signal-in-Space Anomalies in the Last Decade Data Mining of 400,000,000 GPS Navigation Messages," Proceedings of the 23rd International Technical Meeting of the Satellite Division of The Institute of Navigation (ION GNSS 2010) Sep. 21-24, 2010 (Year: 2010).*

* cited by examiner

METHOD, APPARATUS, AND RELATED DEVICE FOR IDENTIFYING GNSS PSEUDOLITE DATA

CROSS-REFERENCE TO RELATED APPLICATIONS

This application is a continuation of International Application No. PCT/CN2021/126328, filed on Oct. 26, 2021, which claims priority to Chinese Patent Application No. 202011180719.X, filed on Oct. 29, 2020. The disclosures of the aforementioned applications are incorporated herein by reference in these entireties.

TECHNICAL FIELD

This application relates to the communications field, and in particular, to a method, apparatus, and related device for identifying GNSS pseudolite data.

BACKGROUND

A global navigation satellite system (GNSS) can provide a user with services such as positioning and time information.

The GNSS normally includes a terrestrial station, multiple GNSS satellites, and a GNSS receiver. The terrestrial station is responsible for monitoring the system. The terrestrial station receives and measures signals of GNSS satellites, calculates operating orbits of the GNSS satellites, and transmits operating orbit information of the GNSS satellites to the GNSS satellites, so that the GNSS satellites can rebroadcast the information. The GNSS satellites are responsible for broadcasting the signals to the ground. The GNSS receiver is configured to receive the signals broadcast by the GNSS satellites, and obtain information such as ephemerides and almanacs of the GNSS satellites from the signals of the GNSS satellites. Specifically, the GNSS receiver obtains four three-dimensional coordinates from four GNSS satellites, and obtains information about a location and a time point of the GNSS receiver based on the following system of equations:

$$((x-x1)^2+(y-y1)^2+(z-z1)^2)^{1/2}+c\times t=r1;$$

$$((x-x2)^2+(y-y2)^2+(z-z2)^2)^{1/2}+c\times t=r2;$$

$$((x-x3)^2+(y-y3)^2+(z-z3)^2)^{1/2}+c\times t=r3; \text{ and}$$

$$((x-x4)^2+(y-y4)^2+(z-z4)^2)^{1/2}+c\times t=r4.$$

Location coordinates of the GNSS receiver are (x, y, z). Location coordinates of the four GNSS satellites are (xn, yn, zn), where n=1, 2, 3, and 4. Distances from the GNSS satellites to the GNSS receiver are r1, r2, r3, and r4. Herein, c is a speed of light, and t is a clock bias. Based on the foregoing system of equations, the GNSS receiver may obtain three-dimensional coordinates of the GNSS receiver and the clock bias t. The GNSS receiver corrects a time point of the GNSS receiver by using the clock bias t, so that the time point of the GNSS receiver can be synchronized with the time points of the GNSS satellites.

If t output by the GNSS receiver is inaccurate, an access network device on which the GNSS receiver is installed cannot accurately perform time synchronization with the GNSS satellites. A GNSS pseudo-satellite (GNSS pseudolite for short) provides the GNSS receiver with a pseudo ephemeris or almanac through replaying or masquerading. Consequently, the access network device cannot discern if the ephemeris or the almanac is sent by the GNSS pseudolite, and therefore cannot protect itself from pseudolites.

SUMMARY

This application provides a method, apparatus, and related device for identifying GNSS pseudolite data.

A first aspect of this application provides a method for identifying GNSS pseudolite data.

The method includes: a target device receives a plurality of pieces of first data sent by a plurality of access network devices, where each piece of the plurality of pieces of first data includes first ephemeris information and/or first almanac information. The target device determines abnormal first data among the plurality of pieces of first data, where the plurality of pieces of first data include the abnormal first data, and a plurality of pieces of first ephemeris information and/or a plurality of pieces of first almanac information in the plurality of pieces of first data correspond to a first satellite. Each piece of first data in the plurality of pieces of first data includes first ephemeris information and/or first almanac information of the first satellite. The access network device is installed with a satellite card, namely, a GNSS receiver. An ephemeris or an almanac sent by a same GNSS satellite has timeliness and a periodicity, and there is no regularity among different GNSS satellites. It is quite difficult for a GNSS pseudolite to imitate the timeliness and the periodicity of a GNSS satellite. Therefore, the target device may determine, by using the plurality of pieces of first ephemeris information and/or the plurality of pieces of first almanac information sent by the plurality of access network devices, that a piece of first ephemeris information and/or a piece of first almanac information are/is abnormal, that is, identify the abnormal first data. The abnormal first data may be GNSS pseudolite data. Therefore, a basis is provided for invoking appropriate protection.

In an optional manner of the first aspect, the first ephemeris information and/or the first almanac information are/is obtained by the access network device from second ephemeris information and/or second almanac information using a hash function, and the second ephemeris information and/or the second almanac information are/is obtained by the access network device from the first satellite. The access network device processes the second ephemeris information and/or the second almanac information using the hash function, so that an amount of data transmitted between the access network device and the target device may be reduced. In addition, the first ephemeris information and/or the first almanac information processed by using the hash function still retains some features of the second ephemeris information and/or the second almanac information, and therefore may still be used by the target device to determine the abnormal first ephemeris information and/or first almanac information.

In an optional manner of the first aspect, the abnormal first data is determined to be abnormal because it is an outlier among the plurality of pieces of first data. The ephemeris or the almanac sent by the GNSS satellite has the timeliness and the periodicity, and the ephemerides or almanacs received by the plurality of access network devices should be the same as or similar. Therefore, when a piece of first data is the outlier in the plurality of pieces of first data, that piece of first data is usually the abnormal first data.

In an optional manner of the first aspect, after the target device receives a first piece of first data sent by the access network device, the target device sends a GNSS pseudolite prompt to the access network device, where the GNSS pseudolite prompt includes an identifier of the first satellite. The target device feeds back the identifier of the first satellite to the access network device, so that the access network device can learn that the first piece of first data is GNSS pseudolite data or the access network device can learn that the first satellite is a GNSS pseudolite, thereby providing a basis for invoking appropriate protection.

A second aspect of this application provides a method for identifying GNSS pseudolite data.

The method includes: An access network device sends a first piece of first data to a target device, where the first piece of first data includes first ephemeris information and/or first almanac information, the first piece of first data is used by the target device to determine abnormal first data based on a plurality of pieces of first data, the plurality of pieces of first data include the abnormal first data, the plurality of pieces of first data are obtained by the target device from a plurality of access network devices, and a plurality of pieces of first ephemeris information and/or a plurality of pieces of first almanac information in the plurality of pieces of first data correspond to a first satellite.

In an optional manner of the second aspect, before the access network device sends the first piece of first data to the target device, the method further includes: The access network device receives second ephemeris information and/or second almanac information from the first satellite. The access network device processes the second ephemeris information and/or the second almanac information by using a hash function, to obtain the first ephemeris information and/or the first almanac information.

In an optional manner of the second aspect, the first piece of first data is an outlier in the plurality of pieces of first data.

In an optional manner of the second aspect, after the access network device sends the first data to the target device, the access network device receives a GNSS pseudolite prompt sent by the target device, where the GNSS pseudolite prompt includes an identifier of the first satellite, and the access network device updates a time point of the access network device based on ephemeris information of a plurality of GNSS satellites, where the plurality of GNSS satellites do not include the first satellite.

A third aspect of this application provides an apparatus for identifying GNSS pseudolite data.

The apparatus includes: a receiving module, configured to receive a first piece of first data sent by an access network device, where the first piece of first data includes first ephemeris information and/or first almanac information; and a determining module, configured to determine abnormal first data based on a plurality of pieces of first data, where the plurality of pieces of first data include the abnormal first data, the plurality of pieces of first data are obtained by the target device from a plurality of access network devices, and a plurality of pieces of first ephemeris information and/or a plurality of pieces of first almanac information in the plurality of pieces of first data correspond to a first satellite.

In an optional manner of the third aspect, the first ephemeris information and/or the first almanac information are/is obtained by the access network device based on second ephemeris information and/or second almanac information, and the second ephemeris information and/or the second almanac information are/is obtained by the access network device from the first satellite.

In an optional manner of the third aspect, the first piece of first data is an outlier in the plurality of pieces of first data.

In an optional manner of the third aspect, the apparatus further includes:

a sending module, configured to send a GNSS pseudolite prompt to the access network device, where the GNSS pseudolite prompt includes an identifier of the first satellite.

A fourth aspect of this application provides an apparatus for identifying GNSS pseudolite data.

The apparatus includes: a sending module, configured to send a piece of first data to a target device, where the first piece of first data includes first ephemeris information and/or first almanac information, the first piece of first data is used by the target device to determine abnormal first data based on a plurality of pieces of first data, the plurality of pieces of first data include the abnormal first data, the plurality of pieces of first data are obtained by the target device from a plurality of access network devices, and a plurality of pieces of first ephemeris information and/or a plurality of pieces of first almanac information in the plurality of pieces of first data correspond to a first satellite.

In an optional manner of the fourth aspect, the apparatus further includes:

- a receiving module, configured to receive second ephemeris information and/or second almanac information from the first satellite; and
- a processing module, configured to process the second ephemeris information and/or the second almanac information by using a hash function, to obtain the first ephemeris information and/or the first almanac information.

In an optional manner of the fourth aspect, the first piece of first data is an outlier in the plurality of pieces of first data.

In an optional manner of the fourth aspect, the apparatus further includes:

- a receiving module, configured to receive a GNSS pseudolite prompt sent by the target device, where the GNSS pseudolite prompt includes an identifier of the first satellite; and
- an updating module, configured to update a time point of the access network device based on ephemeris information of a plurality of GNSS satellites, where the plurality of GNSS satellites do not include the first satellite.

A fifth aspect of this application provides a device for identifying GNSS pseudolite data.

The device includes a transceiver and a processor.

The transceiver is configured to receive a first piece of first data sent by an access network device, where the first piece of first data includes first ephemeris information and/or first almanac information.

The processor is configured to determine abnormal first data based on a plurality of pieces of first data, where the plurality of pieces of first data include the abnormal first data, the plurality of pieces of first data are obtained by the target device from a plurality of access network devices, and a plurality of pieces of first ephemeris information and/or a plurality of pieces of first almanac information in the plurality of pieces of first data correspond to a first satellite.

In an optional manner of the fifth aspect, the first ephemeris information and/or the first almanac information are/is obtained by the access network device based on second ephemeris information and/or second almanac information, and the second ephemeris information and/or the second almanac information are/is obtained by the access network device from the first satellite.

In an optional manner of the fifth aspect, the first piece of first data is an outlier in the plurality of pieces of first data.

In an optional manner of the fifth aspect, the device further includes:

a sending module, configured to send a GNSS pseudolite prompt to the access network device, where the GNSS pseudolite prompt includes an identifier of the first satellite.

A sixth aspect of this application provides a device for identifying GNSS pseudolite data.

The device includes a transceiver and a processor.

The transceiver is configured to send a first piece of first data to a target device, where the first piece of first data includes first ephemeris information and/or first almanac information, the first piece of first data is used by the target device to determine abnormal first data based on a plurality of pieces of first data, the plurality of pieces of first data include the abnormal first data, the plurality of pieces of first data are obtained by the target device from a plurality of access network devices, and a plurality of pieces of first ephemeris information and/or a plurality of pieces of first almanac information in the plurality of pieces of first data correspond to a first satellite.

In an optional manner of the sixth aspect, the device further includes:

a receiving module, configured to receive second ephemeris information and/or second almanac information from the first satellite; and a processing module, configured to process the second ephemeris information and/or the second almanac information by using a hash function, to obtain the first ephemeris information and/or the first almanac information.

In an optional manner of the sixth aspect, the first piece of first data is an outlier in the plurality of pieces of first data.

In an optional manner of the sixth aspect, the device further includes:

a receiving module, configured to receive a GNSS pseudolite prompt sent by the target device, where the GNSS pseudolite prompt includes an identifier of the first satellite; and an updating module, configured to update a time point of the access network device based on ephemeris information of a plurality of GNSS satellites, where the plurality of GNSS satellites do not include the first satellite.

A seventh aspect of this application provides a computer-storage medium. The computer-storage medium stores instructions. When the instructions are executed on a computer, the computer is enabled to perform the method according to any one of the first aspect or the implementations of the first aspect; or the computer is enabled to perform the method according to any one of the second aspect or the implementations of the second aspect.

An eighth aspect of this application provides a computer program product. When the computer program product is executed on a computer, the computer is enabled to perform the method according to any one of the first aspect or the implementations of the first aspect; or the computer is enabled to perform the method according to any one of the second aspect or the implementations of the second aspect.

DESCRIPTION OF EMBODIMENTS

Embodiments of this application provide a method, apparatus, and related device for identifying GNSS pseudolite data as applied to the communications field. For example, features or content marked by dashed lines in the accompanying drawings in embodiments of this application may be understood as optional operations or optional structures of embodiments.

Figure 1:
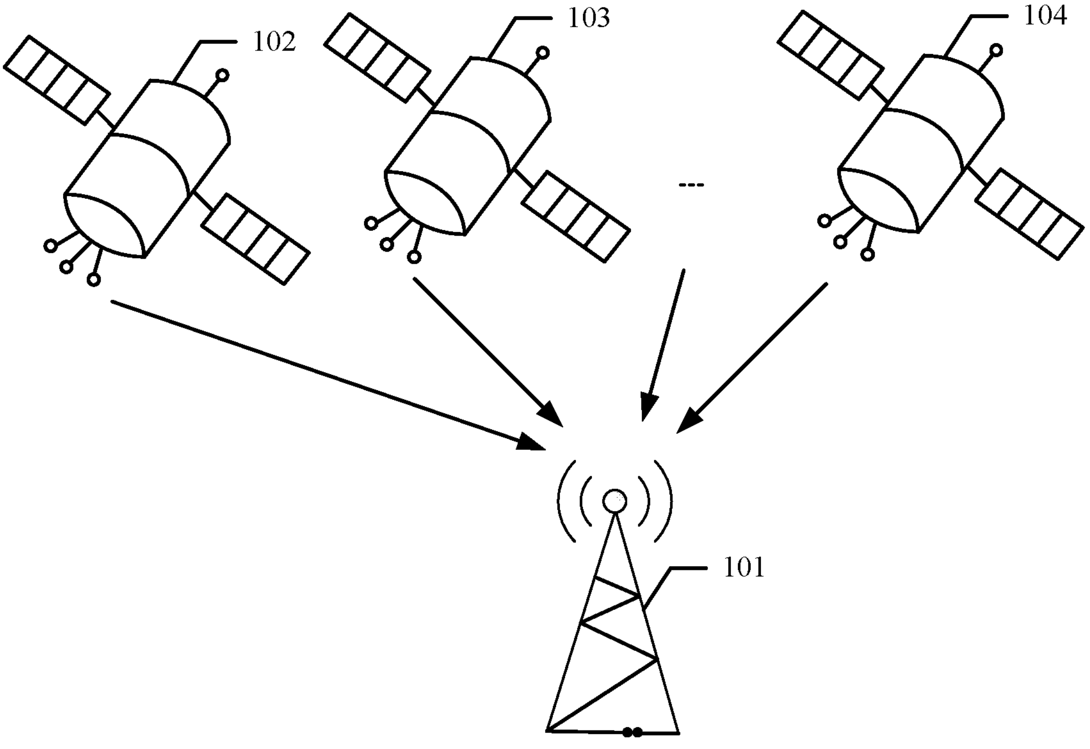
FIG. 1 is a schematic diagram of a structure of a scenario in which an access network device performs time synchronization.

A GNSS system may provide a user with services such as positioning and time information. A GNSS system includes a terrestrial station, a GNSS satellite (satellite for short), and a GNSS receiver. The terrestrial station is responsible for monitoring. The terrestrial station receives and measures signals of GNSS satellites, calculates operating orbits of the GNSS satellites, and transmits operating orbit information of the GNSS satellites to the GNSS satellites, so that the GNSS satellites rebroadcast the information. The GNSS satellites are responsible for broadcasting the signals to the ground. The GNSS receiver is configured to receive the signals broadcast by the GNSS satellites, and obtain information such as ephemerides and almanacs of the GNSS satellites from the signals of the GNSS satellites. Specifically, FIG. 1 is a schematic diagram of a structure of a scenario in which an access network device performs time synchronization. FIG. 1 includes a GNSS satellite 102, a GNSS satellite 103, a GNSS satellite 104, and other more GNSS satellites. The access network device 101 receives a plurality of ephemerides and almanacs from a plurality of GNSS satellites. The access network device 101 may obtain three-dimensional coordinates of the GNSS satellites by parsing content in the ephemerides. Theoretically, the access network device 101 only needs to obtain three-dimensional coordinates of three GNSS satellites, to determine a location of the access network device 101. However, because there may be a clock bias (which is also referred to as an equation of time) between the access network device 101 and the GNSS satellites, the access network device 101 needs to obtain three-dimensional coordinates of four GNSS satellites, and obtain the location and time information of the access network device 101 by using the following system of equations:

$$((x-x1)^2+(y-y1)^2+(z-z1)^2)^{1/2}+c\times t=r1;$$

$$((x-x2)^2+(y-y2)^2+(z-z2)^2)^{1/2}+c\times t=r2;$$

-continued $$\left((x-x3)^2+(y-y3)^2+(z-z3)^2\right)^{1/2}+c\times t=r3; \text{ and}$$

$$\left((x-x4)^2+(y-y4)^2+(z-z4)^2\right)^{1/2}+c\times t=r4.$$

Location coordinates of the access network device 101 are (x, y, z). Location coordinates of the four GNSS satellites are (xn, yn, zn), where n=1, 2, 3, and 4. Distances from the GNSS satellites to the access network device 101 are r1, r2, r3, and r4. c is a speed of light, and t is a clock bias. Based on the foregoing system of equations, the access network device 101 may obtain three-dimensional coordinates of the access network device 101 and the clock bias t. The access network device 101 corrects a time point of the access network device 101 by using the clock bias t, so that the time point of the access network device 101 can be synchronized with the time points of the GNSS satellites.

However, if the foregoing four GNSS satellites include one GNSS pseudolite, t obtained by the access network device 101 by solving the foregoing system of equations may be inaccurate. If t is inaccurate, the access network device 101 cannot accurately perform time synchronization with the GNSS satellites. A synchronization system of the access network device 101 is a one-way tracking system, and is not closed-loop. When an error occurs in a reference source of the GNSS (or a GNSS reference source transmitted through a 1588 interface), the independent access network device 101 cannot identify the error, and normally tracks the reference source that has had a phase offset. When the synchronization system of the access network device 101 is biased, a time signal generated by the synchronization system of the access network device 101 is used in a baseband and a radio frequency module as a reference of the system. As a result, a radio frame is offset to some extent, causing jamming on a surrounding station. Therefore, this application provides a method for identifying GNSS pseudolite data. In the method, an access network device sends a (first) piece of first data to a target device, where the first piece of first data includes first ephemeris information or first almanac information. The target device determines abnormal first data based on a plurality of pieces of first data sent by a plurality of access network devices. The plurality of pieces of first data include a plurality of pieces of first ephemeris information or a plurality of pieces of first almanac information, and each piece of first ephemeris information or first almanac information is ephemeris or almanac information received by a different access network device from a first satellite. It should be noted that the access network device considers the first ephemeris information or the first almanac information as being obtained from the first satellite, but the first ephemeris information or the first almanac information is not necessarily sent by the first satellite, but instead may be sent by a pseudo first satellite that a GNSS pseudolite masquerades as.

Figure 2:
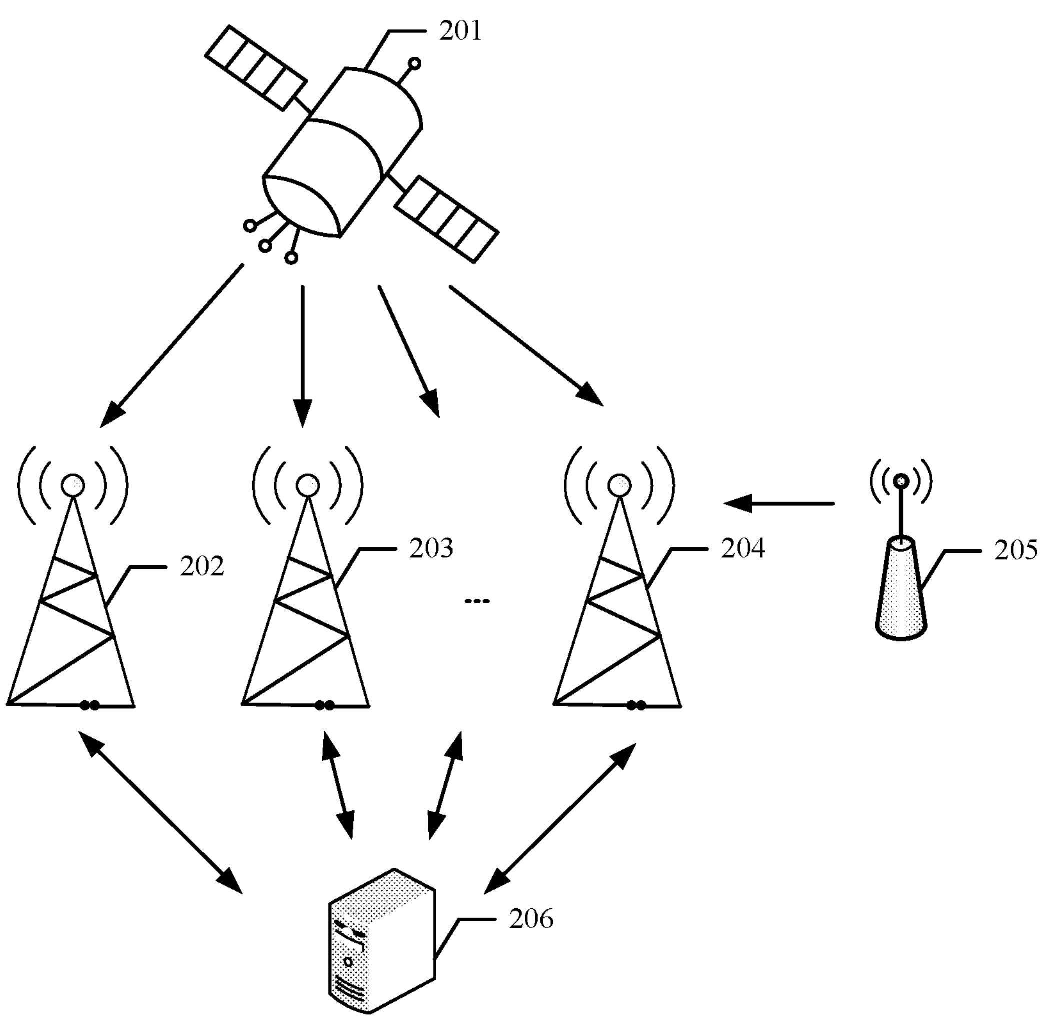
FIG. 2 is a schematic diagram of a network framework according to an embodiment of this application.

FIG. 2 is a schematic diagram of a network framework according to an embodiment of this application. FIG. 2 includes a GNSS satellite 201, an access network device 202, an access network device 203, an access network device 204, a jamming source 205, and a target device 206. The GNSS satellite 201 periodically broadcasts ephemerides or almanacs. Because the signal coverage of the GNSS satellite 201 is large, many access network devices may receive the ephemeris or the almanacs broadcast by the GNSS satellite 201. Herein, descriptions are provided merely by using an example in which the many access network devices include the access network device 202, the access network device 203, and the access network device 204. The jamming source 205 may be jamming from military equipment, or may be jamming from civil equipment. Generally, there are two types of jamming sources. The jamming source 205 in FIG. 2 is used as an example. One type is a blanketing jamming source 205. The blanketing jamming source 205 makes the access network device 204 fail to normally receive an ephemeris and an almanac sent by the GNSS satellite 201. Therefore, the ephemeris and the almanac received by the access network device 204 are inaccurate. The other type is a deception jamming source 205. The deception jamming source 205 sends a signal similar to that of the GNSS satellite 201, but the signal may be a signal of the GNSS satellite 201 sent some time ago. This still makes an ephemeris and an almanac received by the access network device 204 to be inaccurate. The target device 206 receives a plurality of pieces of first data sent by a plurality of access network devices, and then determines abnormal first data based on the plurality of pieces of first data.

The access network devices 202 to 204 in this embodiment of this application each are a device that is in a network and that is configured to connect a terminal device to a wireless network. An access network device is installed with a satellite card or a GNSS receiver. The access network device may be a node in a radio access network, may also be referred to as a base station or a radio access network (RAN) node (or device). A network device may include an evolved NodeB (NodeB or eNB or eNodeB, evolved NodeB) in a long term evolution (LTE) system or an LTE-advanced (LTE-A) system, for example, a conventional macro base station eNB and a micro base station eNB in a heterogeneous network scenario; may include a next generation NodeB (gNB) in a 5th generation (5G) new radio (NR) system; or may include a radio network controller (RNC), a NodeB (NB), a base station controller (BSC), a base transceiver station (BTS), a transmission reception point (TRP), a home base station (for example, home evolved NodeB, or home NodeB, HNB), a base band unit (BBU), a base band unit pool BBU pool, a Wi-Fi access point (AP), or the like.

The target device 206 in this embodiment of this application may be a server, a desktop computer, a notebook computer, or a network management device. The GNSS satellite 201 may be a GPS satellite, a BeiDou satellite, or the like.

Figure 3:
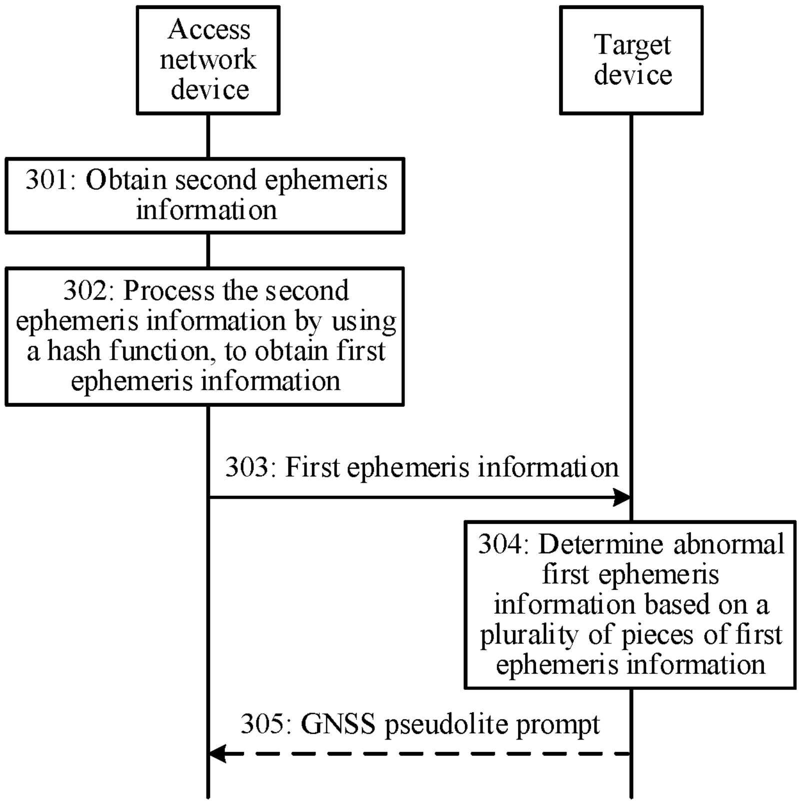
FIG. 3 is a schematic flowchart of identifying GNSS pseudolite data according to an embodiment of this application.

A piece of first data includes first ephemeris data and/or first almanac data. For ease of description, the following describes, by using an example in which the first data includes first ephemeris information, a method for identifying GNSS pseudolite data in embodiments of this application. FIG. 3 is a schematic flowchart of identifying GNSS pseudolite data according to an embodiment of this application.

In step 301, an access network device obtains second ephemeris information.

The access network device may be the access network devices 202 to 204 in FIG. 2. The access network device receives the second ephemeris information from a navigation message of a first satellite. A GPS is used as an example, a navigation message of the GPS is arranged into a bit stream in a form of frames, and each frame is 1500 bits. The 1500 bits are further divided into five subframes, and each subframe is 300 bits. Each subframe is further divided into 10 words. It takes 20 ms to send each bit and 30 s to send one frame. Data of a second subframe and a third subframe of the navigation message may be combined to provide a set of satellite ephemeris parameters. The ephemeris parameters include an ephemeris reference time point, a square root of satellite orbit semi-major axis A, a satellite orbital eccentricity, orbit inclination angle at the ephemeris reference time point, an angular distance of the perigee, and the like. In addition to the ephemeris parameters, the second subframe and the third subframe of the navigation message further include an issue of ephemeris data, a validity period indication flag of the ephemeris data, an AODO (Age of Data Offset), and the like. The second ephemeris information includes some or all information of the ephemeris parameters. For example, the second ephemeris information includes the ephemeris reference time point, or the second ephemeris information includes the ephemeris reference time point and the square root of satellite orbit semi-major axis A. Similarly, when first data includes first almanac information, second almanac information corresponding to the first almanac information may include some or all information of almanac parameters. The almanac parameters are carried in a fourth subframe and a fifth subframe of the navigation message.

A GPS satellite is a medium-orbit earth satellite. An average altitude of a satellite orbit is about 20200 km. An operating orbit is an ellipse quite close to a circle. An operating periodicity is 11 hours and 58 minutes. Given the Earth's rotation with a periodicity of 24 hours, operation and distribution statuses of the satellite are repeated approximately every 23 hours and 56 minutes (1436 minutes) relative to a fixed observation point on the ground. When the second ephemeris information received by the access network device does not meet the requirement of the periodicity, the access network device needs to exclude the second ephemeris information. In other words, in step 303, the access network device does not send first ephemeris information to a target device. The access network device may usually receive ephemeris information of a plurality of satellites. Therefore, excluding a specific piece of ephemeris information does not affect the method for identifying GNSS pseudolite data in embodiments of this application.

In step 302, the access network device processes the second ephemeris information by using a hash function, to obtain the first ephemeris information.

A hash function is a one-way cryptosystem. To be specific, a hash function is irreversible mapping from plaintext to ciphertext. There is only an encryption process and no decryption process. In addition, the hash function may change input of any length to output of a fixed length. This one-way feature of a hash function and the feature of the fixed output data length allow a hash function to generate messages or data. In this application, the second ephemeris information is processed by using a hash function, to obtain the first ephemeris information having a small data amount.

In step 303, the access network device sends the first ephemeris information to the target device.

In addition to the first ephemeris information, the access network device may further send code of the first satellite to the target device, where the code indicates a correspondence between the first ephemeris information and the first satellite. In actual application, the access network device may obtain ephemeris information of another satellite in addition to the first ephemeris information of the first satellite, and send the ephemeris information of the other satellite to the target device. Therefore, the access network device needs to ensure a correspondence between ephemeris information and a satellite. Certainly, the access network device may alternatively not send code of the first satellite to the target device. For example, the access network device needs to send ephemeris information corresponding to six of 32 satellites to the target device. The access network device generates a table of 32 empty locations, and the 32 empty locations are in a one-to-one correspondence with the 32 satellites. The access network device fills the ephemeris information corresponding to the six satellites into six corresponding empty locations in the table, and sends the table to the target device. Based on an agreement between the target device and the access network device made in advance, the target device may determine, by using a location of the ephemeris information in the table, a satellite corresponding to each piece of ephemeris information.

In step 304, the target device determines abnormal first ephemeris information based on a plurality of pieces of first ephemeris information.

The target device may receive the plurality of pieces of first ephemeris information from a plurality of access network devices, and each piece of first ephemeris information corresponds to the first satellite. An ephemeris parameter or an almanac parameter sent by a same satellite has the timeliness and periodicity of the satellite, but there is no regularity among different satellites. It is quite difficult for a GNSS pseudolite to imitate the timeliness and the periodicity Therefore, all pieces of first ephemeris information should be the same or similar. For example, the first ephemeris information includes an ephemeris reference time point, and the plurality of pieces of first ephemeris information include a plurality of ephemeris reference time points. When an ephemeris reference time point is an outlier in the plurality of ephemeris reference time points, the target device may determine that first ephemeris information corresponding to the ephemeris reference time point is abnormal. The first ephemeris information is abnormal ephemeris information. An outlier-related algorithm is not limited in this application. For example, The ephemeris reference time point is an outlier if the difference between the ephemeris reference time point and a median of the plurality of ephemeris reference time points is greater than N, N being a pre-defined threshold. As generally known, an outlier is statistical term that refers to a data point that deviates from the median of a collection of data points by more than a statistically defined threshold.

Figure 4:
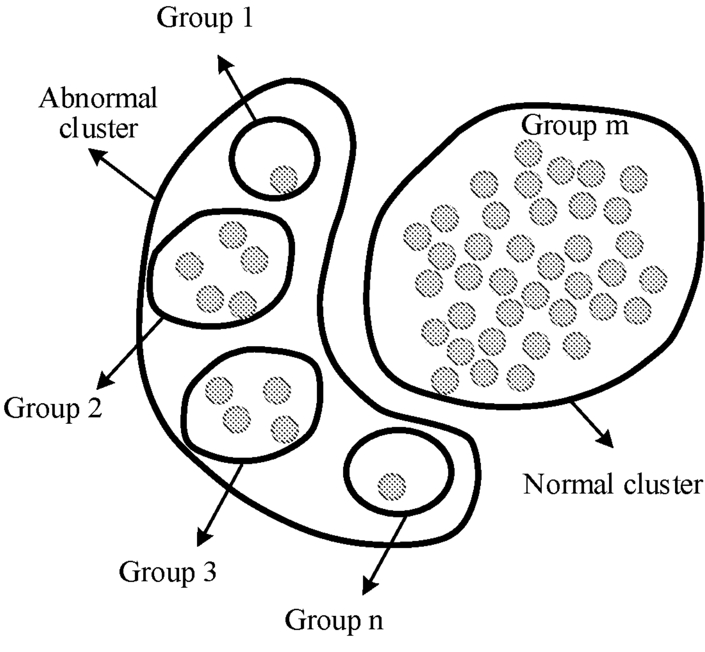
FIG. 4 is a schematic diagram of a structure of identifying GNSS pseudolite data through clustering according to an embodiment of this application.

The target device may receive the plurality of pieces of first ephemeris information from the plurality of access network devices, and the target device may cluster the plurality of pieces of first ephemeris information. Same or similar first ephemeris information is classified as one class. A majority class and a minority class may be obtained through clustering. FIG. 4 is a schematic diagram of a structure of identifying GNSS pseudolite data through clustering according to an embodiment of this application. In FIG. 4, the target device classifies the plurality of pieces of first ephemeris information into five groups: Group 1 (Group 1), Group 2 (Group 2), Group 3 (Group 3), Group n (Group n), and Group m (Group m). Group 1, Group 2, Group 3, and Group n are minority classes, which are also referred to as abnormal clusters. Group m is a majority class, which is also referred to as a normal cluster. A quantity of pieces of first ephemeris data in each minority class is usually less than 10 because transmit power of the GNSS pseudolite, namely, a jamming source, is limited. First ephemeris information in the minority class is abnormal first ephemeris data.

A first satellite corresponding to the abnormal first ephemeris information is abnormal. By analogy, the target device may further determine whether other satellites are pseudolites, thereby obtaining Table 1.

TABLE 1

| Time point | Base station name | Satellite in-service status (where 1 identifies in-service, and 0 identifies out-of-service) | Satellite status (where 1 identifies abnormality, and 0 identifies others) |
|---|---|---|---|
| Jan. 15, 2020 | gNB 1 | 1111 1111 0000 0000 0101 0000 1110 0011 | 0000 0101 0000 0000 0000 0000 0000 0000 |
| Jan. 15, 2020 | gNB 2 | 1111 1110 0000 0000 0101 0000 1110 0011 | 0000 0100 0000 0000 0000 0000 0000 0000 |
| Jan. 15, 2020 | gNB n | 1111 1111 0000 0000 0101 0000 1110 0011 | 0000 0101 0000 0000 0000 0000 0000 0000 |
| | . . . | . . . | . . . |

As shown in Table 1, the first column represents a time point. More specifically, the time point may be accurate to the hour. The second column represents a code number of an access network device, for example, gNB 1 or gNB 2. The third column represents a satellite in-service status. For example, for gNB 1, there are 32 GNSS satellites in total, satellite 8 is in-service, and satellite 9 is out-of-service. For example, for gNB 2, satellite 8 is out-of-service, and satellite 9 is out-of-service. Certainly, for gNB 1, satellite 8 may be a pseudolite. That is, the real satellite 8 may be out-of-service. The fourth column represents a satellite status that is obtained by the target device based on abnormal ephemeris information. For example, for satellite 8 in gNB 1, gNB 1 sends ephemeris information corresponding to satellite 8 to the target device. After determining, based on a plurality of pieces of ephemeris information that correspond to satellite 8 and that are sent by a plurality of access network devices, that the ephemeris information sent by gNB 1 is abnormal ephemeris information, the target device determines that the satellite 8 in gNB 1 is a pseudolite. Similarly, satellite 6 in gNB 1 is also determined by the target device as a pseudolite.

In step 305, the target device sends a GNSS pseudolite prompt to the access network device.

In step 304, the target device determines the abnormal first ephemeris information, and the target device sends the GNSS pseudolite prompt to the access network device that sends the first ephemeris information. Herein, it is assumed that the abnormal first ephemeris information is sent by the access network device to the target device in step 303. The GNSS pseudolite prompt includes the code of the first satellite.

Then, the access network device performs time synchronization with the satellites based on the ephemeris information of the plurality of satellites. Specifically, the access network device calculates a clock bias t by using the system of equations in the foregoing related descriptions in FIG. 1. When the system of equations is calculated by using ephemeris information of four satellites, the four satellites do not include the first satellite. Therefore, the access network device can improve accuracy of t, and improve accuracy of the time synchronization.

Figures 5, 6, 7:
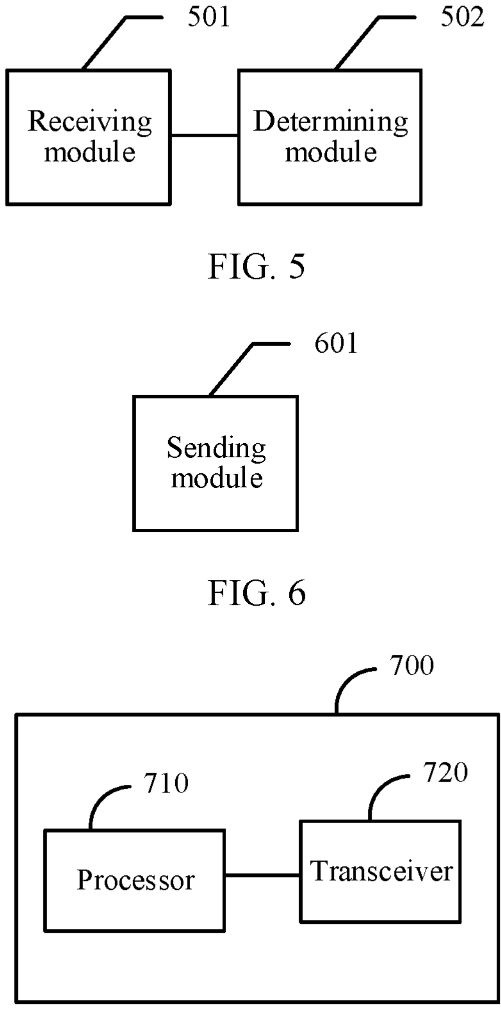
FIG. 5 is a schematic diagram of a structure of an apparatus for identifying GNSS pseudolite data according to an embodiment of this application.
FIG. 6 is another schematic diagram of a structure of an apparatus for identifying GNSS pseudolite data according to an embodiment of this application.
FIG. 7 is a schematic diagram of a structure of a device for identifying GNSS pseudolite data according to an embodiment of this application.

The foregoing describes the method for identifying GNSS pseudolite data in embodiments of this application, and the following describes an apparatus for identifying GNSS pseudolite data in embodiments of this application. FIG. 5 is a schematic diagram of a structure of an apparatus for identifying GNSS pseudolite data according to an embodiment of this application.

The apparatus includes: a receiving module 501, which may be implemented as hardware (e.g., a receiver) or software or hardware plus software, configured to receive first data sent by an access network device, where the first data includes first ephemeris information and/or first almanac information; and a determining module 502, which may be implemented as hardware (e.g., processing circuit or circuits) or software or hardware plus software, configured to determine abnormal first data based on a plurality of pieces of first data, where the plurality of pieces of first data include the abnormal first data, the plurality of pieces of first data are obtained by the target device from a plurality of access network devices, and a plurality of pieces of first ephemeris information and/or a plurality of pieces of first almanac information in the plurality of pieces of first data correspond to a first satellite.

In another embodiment, the apparatus may further include a sending module or the like. The modules in the apparatus are configured to perform all or some operations that can be performed by the target device in the embodiment corresponding to FIG. 4.

FIG. 6 is another schematic diagram of a structure of an apparatus for identifying GNSS pseudolite data according to an embodiment of this application.

The apparatus includes: a sending module 601, which may be implemented hardware (e.g., a transmitter) or software or hardware plus software, configured to send first data to a target device, where the first data includes first ephemeris information and/or first almanac information, the first data is used by the target device to determine abnormal first data based on a plurality of pieces of first data, the plurality of pieces of first data include the abnormal first data, the plurality of pieces of first data are obtained by the target device from a plurality of access network devices, and a plurality of pieces of first ephemeris information and/or a plurality of pieces of first almanac information in the plurality of pieces of first data correspond to a first satellite.

In another embodiment, the apparatus may further include a receiving module, which may be implemented as hardware (e.g., a receiver) or software or hardware plus software, a processing module, which may be implemented as hardware (e.g., one or more processors or processing circuits) or software or hardware plus software, or the like. The modules in the apparatus are configured to perform all or some operations that can be performed by the access network device in the embodiment corresponding to FIG. 4.

The foregoing describes the apparatus for identifying GNSS pseudolite data in embodiments of this application, and the following describes a device for identifying GNSS pseudolite data in embodiments of this application.

FIG. 7 is a schematic diagram of a structure of a device for identifying GNSS pseudolite data according to an embodiment of this application.

As shown in FIG. 7, the device 700 for identifying GNSS pseudolite data includes a processor 710 and a transceiver 720 coupled to the processor 710. The processor 710 may be a central processing unit (CPU), a network processor (NP), or a combination of a CPU and an NP. The processor may alternatively be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The processor 710 may be one processor, or may include a plurality of processors.

In another embodiment, the device for identifying GNSS pseudolite data further includes a memory. The memory may include a volatile memory, for example, a random-access memory (RAM). The memory 720 may alternatively include a non-volatile memory, for example, a read-only memory (ROM), a FRAM memory, a flash memory, a hard disk drive (HDD), or a solid-state drive (SSD). The memory may alternatively include a combination of the foregoing types of memories.

When the device for identifying GNSS pseudolite data is a target device:

The transceiver 720 is configured to receive a first piece of first data sent by an access network device, where the first piece of first data includes first ephemeris information and/or first almanac information. The processor 710 is configured to determine abnormal first data based on a plurality of pieces of first data, where the plurality of pieces of first data include the abnormal first data, the plurality of pieces of first data are obtained by the target device from a plurality of access network devices, and a plurality of pieces of first ephemeris information and/or a plurality of pieces of first almanac information in the plurality of pieces of first data correspond to a first satellite.

In another embodiment, the processor 710 is further configured to perform, based on indications of computer-readable instructions after executing the computer-readable instructions in the memory, all or some operations that can be performed by the target device, for example, an operation performed by the target device in the embodiment corresponding to FIG. 3.

When the device for identifying GNSS pseudolite data is an access network device:

The transceiver 720 is configured to send first data to a target device, where the first data includes first ephemeris information and/or first almanac information, the first data is used by the target device to determine abnormal first data based on a plurality of pieces of first data, the plurality of pieces of first data include the abnormal first data, the plurality of pieces of first data are obtained by the target device from a plurality of access network devices, and a plurality of pieces of first ephemeris information and/or a plurality of pieces of first almanac information in the plurality of pieces of first data correspond to a first satellite.

In another embodiment, the processor 710 is further configured to perform, based on indications of computer-readable instructions after executing the computer-readable instructions in the memory, all or some operations that can be performed by the access network device, for example, an operation performed by the access network device in the embodiment corresponding to FIG. 3.

In the several embodiments provided in this application, it should be understood that the disclosed system, apparatus, and method may be implemented in other manners. For example, the foregoing apparatus embodiments are merely examples. For example, the division into the units may be logical function division and may be other division in actual implementation. For example, a plurality of units or components may be combined or integrated into another system, or some features may be skipped or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods in embodiments of this application. The foregoing storage medium includes any medium that can store program code, such as a flash drive, a removable hard disk, a ROM, a RAM, a magnetic disk, or an optical disc.

What is claimed is:

1. A method, comprising:

receiving, a first piece of first data from an access network device, wherein the first piece of the first data comprises first ephemeris information and/or first almanac information;

receiving, a plurality of pieces of first data from a plurality of different access network devices, wherein each of the plurality of different access network devices acquires the plurality of pieces of first data from a first satellite, the plurality of pieces of first data comprises the first piece of first data and at least one of a plurality of pieces of first ephemeris information or a plurality of pieces of first almanac information in the plurality of pieces of first data correspond to the first satellite; and identifying, abnormal first data among the plurality of pieces of first data to detect global navigation satellite system (GNSS) pseudolite data, wherein the abnormal first data is identified as an outlier in the plurality of pieces of first data, wherein the outlier is determined based on at least one of:

a difference between the first piece of first data and a median of the plurality of pieces of first data is greater than a pre-defined threshold, or by clustering the plurality of pieces of first data into majority and minority classes and identifying a minority class as abnormal, wherein, prior to the identifying, a piece of ephemeris information that does not satisfy a periodicity requirement is excluded from the plurality of pieces of first data; and updating the plurality of pieces of first data by excluding the abnormal first data identified as GNSS pseudolite data for performing time synchronization.

2. The method according to claim 1, wherein the at least one of the first ephemeris information or the first almanac information are/is obtained by using a hash function according to at least one of second ephemeris information or second almanac information, and the second ephemeris information and/or the second almanac information are/is obtained from the first satellite.

3. The method according to claim 1, wherein after the receiving, the first piece of first data from the access network device, the method further comprises:

sending, a pseudolite prompt to the access network device, wherein the pseudolite prompt comprises an identifier of the first satellite.

4. An apparatus, comprising:

a processor and a memory, wherein the memory is configured to store a computer program, and the processor is configured to invoke the computer program stored in the memory, wherein the computer program instructs the processor to:

receive, a first piece of first data from an access network device, wherein the first piece of first data comprises first ephemeris information and/or first almanac information;

receive, a plurality of pieces of first data from a plurality of different access network devices, wherein each of the plurality of different access network devices acquires the plurality of pieces of first data from a first satellite, the plurality of pieces of first data comprises the first piece of first data and at least one of a plurality of pieces of first ephemeris information or a plurality of pieces of first almanac information in the plurality of pieces of first data correspond to the first satellite; and determine, abnormal first data based on the plurality of pieces of first data to detect global navigation satellite system (GNSS) pseudolite data, wherein the abnormal first data is determined as an outlier in the plurality of pieces of first data, wherein the outlier is determined based on at least of:

a difference between the first piece of first data and a median of the plurality of pieces of first data is greater than a pre-defined threshold, or by clustering the plurality of pieces of first data into majority and minority classes and identifying a minority class as abnormal, wherein, prior to the determining, a piece of ephemeris information that does not satisfy a periodicity requirement is excluded from the plurality of pieces of first data; and updating the plurality of pieces of first data by excluding the abnormal first data identified as GNSS pseudolite data for performing time synchronization.

5. The apparatus according to claim 4, wherein the at least one of first ephemeris information or the first almanac information are/is obtained by using a hash function according to at least one of second ephemeris information or second almanac information, and the second ephemeris information and/or the second almanac information are/is obtained from the first satellite.

6. The apparatus according to claim 4, wherein the computer program further instructs the processor to:

after receiving, the first piece of first data from the access network device, send a pseudolite prompt to the access network device, wherein the pseudolite prompt comprises an identifier of the first satellite.

7. A system, wherein the system comprises:

a target device comprising a first processor and a first storage medium; and an access network device comprising a second processor and a second storage medium configured to store second instructions to be executed by the second processor to cause a network manager to: send, a first piece of first data to the target device, wherein the first piece of first data comprises at least one of first ephemeris information or first almanac information; and wherein the first storage medium is configured to store instructions to be executed by the first processor to cause a service manager to:

receive, the first piece of first data from the access network device;

receive, a plurality of pieces of first data from a plurality of different access network devices, wherein each of the plurality of different access network devices acquires the plurality of pieces of first data from a first satellite, the plurality of pieces of first data comprises the first piece of first data and at least one of a plurality of pieces of first ephemeris information or a plurality of pieces of first almanac information in the plurality of pieces of first data correspond to the first satellite; and determine, abnormal first data based on the plurality of pieces of first data to detect global navigation satellite system (GNSS) pseudolite data, wherein the abnormal first data is determined as an outlier in the plurality of pieces of first data, wherein the outlier is determined based on at least one of the:

a difference between the first piece of first data and a median of the plurality of pieces of first data is greater than a pre-defined threshold, or by clustering the plurality of pieces of first data into majority and minority classes and identifying a minority class as abnormal, wherein, prior to the determining, a piece of ephemeris information that does not satisfy a periodicity requirement is excluded from the plurality of pieces of first data; and updating the plurality of pieces of first data by excluding the abnormal first data identified as GNSS pseudolite data for performing time synchronization.

8. The system according to claim 7, wherein the access network device is further configured to:

before sending the first piece of first data to the target device, receive at least one of second ephemeris information or second almanac information from the first satellite; and process, at least one of the second ephemeris information or the second almanac information by using a hash function, to obtain at least one of the first ephemeris information or the first almanac information.

9. The system according to claim 8, wherein the second ephemeris information and/or the second almanac information are/is obtained from the first satellite.

10. The system according to claim 7, wherein the target device is further configured to:

after receiving the first piece of first data from the access network device, send a pseudolite prompt to the access network device, wherein the pseudolite prompt comprises an identifier of the first satellite.

11. The system according to claim 7, wherein the access network device is further configured to:

after sending the first piece of first data to a target device, receive, a pseudolite prompt from the target device, wherein the pseudolite prompt comprises an identifier of the first satellite; and update, a time point based on ephemeris information of a plurality of satellites, wherein the plurality of satellites does not comprise the first satellite.

* * * * *